United States Patent
Stenberg

(10) Patent No.: US 8,272,850 B2
(45) Date of Patent: Sep. 25, 2012

(54) MEMBRANE PUMP

(75) Inventor: Johan Stenberg, Härnösand (SE)

(73) Assignee: Xavitech AB, Härnösand (SE)

( * ) Notice: Subject to any disclaimer, the term of this patent is extended or adjusted under 35 U.S.C. 154(b) by 1117 days.

(21) Appl. No.: 12/085,011

(22) PCT Filed: Nov. 12, 2006

(86) PCT No.: PCT/SE2006/001278
§ 371 (c)(1),
(2), (4) Date: May 14, 2008

(87) PCT Pub. No.: WO2007/055642
PCT Pub. Date: May 18, 2007

(65) Prior Publication Data
US 2009/0169402 A1 Jul. 2, 2009

(30) Foreign Application Priority Data
Nov. 14, 2005 (SE) ........................................ 0502507

(51) Int. Cl.
*F04B 17/04* (2006.01)
*H02K 33/00* (2006.01)

(52) U.S. Cl. ........................................ 417/413.1; 310/29

(58) Field of Classification Search ............... 417/413.1, 417/417; 310/15, 25, 28–39
See application file for complete search history.

(56) References Cited

U.S. PATENT DOCUMENTS

| | | | |
|---|---|---|---|
| 2,638,849 A | 5/1953 | Budlane | |
| 3,516,441 A * | 6/1970 | McCormick | 137/625.61 |
| 4,431,952 A | 2/1984 | Sheppard | |
| 4,874,299 A * | 10/1989 | Lopez et al. | 417/413.1 |
| 5,201,641 A * | 4/1993 | Richer | 417/417 |
| 5,678,309 A | 10/1997 | Richter | |
| 5,682,132 A * | 10/1997 | Hiroyoshi et al. | 340/407.1 |
| 5,779,455 A | 7/1998 | Steiger | |
| 6,127,750 A * | 10/2000 | Dadd | 310/13 |
| 6,307,287 B1 | 10/2001 | Garrett et al. | |
| 6,323,568 B1 | 11/2001 | Zabar | |

(Continued)

FOREIGN PATENT DOCUMENTS
FR 2071075 9/1971
(Continued)

*Primary Examiner* — Charles Freay
(74) *Attorney, Agent, or Firm* — Dilworth & Barrese, LLP

(57) ABSTRACT

An electromagnetic driven membrane pump has a pump housing inside which at least one pump chamber (15) having at least one intake and outlet is formed and delimited between a gable (1) of the pump housing and at least one completely-sealed membrane (14) attached to a wall (4) of the pump housing and, in an axial direction of the pump housing, to a running axle (13) suspended in at least two separated suspensions in a longitudinal direction of the axle (13). At least one of the suspensions is composed of a flat spring (9) attached to the axle (13) in a radial direction out toward the wall (4) of the pump housing. The axle (13) is composed of magnetic material to be driven by a magnetic field from an electromagnet (7) for oscillation in its longitudinal direction and moving the membrane (14) in corresponding oscillating movement. The flat spring (9) is composed of an inner and at least one outer part, with the inner part attached to the axle (13) and the outer part(s) attached to the pump housing. These parts are connected with one another by two elastic legs, arranged at each side of the point where the spring is attached to the axle (13).

22 Claims, 3 Drawing Sheets

U.S. PATENT DOCUMENTS

| | | | |
|---|---|---|---|
| 6,514,047 B2 * | 2/2003 | Burr et al. | 417/53 |
| 6,758,657 B1 * | 7/2004 | McNaull et al. | 417/413.1 |
| D554,984 S * | 11/2007 | Stenberg | D8/499 |
| 7,439,641 B2 * | 10/2008 | Ogino et al. | 310/15 |
| 2002/0155012 A1 * | 10/2002 | Zabar | 417/417 |
| 2005/0184601 A1 | 8/2005 | Kweon et al. | |
| 2007/0040454 A1 | 2/2007 | Freudenberger et al. | |

FOREIGN PATENT DOCUMENTS

| | | |
|---|---|---|
| GB | 769907 | 3/1957 |
| GB | 1039145 | 8/1966 |
| WO | 00/22298 | 4/2000 |

* cited by examiner

MEMBRANE PUMP

BACKGROUND OF THE INVENTION

1. Technical Field

The present invention concerns an electromagnetic driven membrane pump. More specifically, the invention relates to an electromagnetic driven membrane pump in accordance with the claims.

2. Technical Background

Membrane pumps that apply pressure or negative pressure are found in a large variety of variations and sizes and are used in many different applications, everything from large industrial membrane pumps to very small membrane pumps for medical purposes. A significant problem during the development of small membrane pumps is that it is difficult to construct a membrane pump that combines a cost efficient method of production with a long lifespan and a high performance level.

The most common type of membrane pump that exists is driven by a rotating motor, which with the aid of an eccentric causes a membrane to perform an oscillating pumping motion. An advantage of powering a membrane pump with an electric motor is that the diameter of the rotor can be chosen to create an adequate lever in order to accomplish the needed moment to perform the pumping, oscillating motion. By adjusting the length of the lever it is possible to choose the gear changing of the motor's output to coincide with the pressure that the membrane pump produces, so that for example high pressure can be attained with minimal motor output. Another advantage with this type of membrane pump is that the membrane attains a well defined end point of the pump stroke.

The main disadvantage with powering a membrane pump with a rotating motor is the life span of the pump is to a large degree dependant on which type of motor that is used. Essential for the life span and efficiency of the membrane pump is the way in which the motor in the membrane pump is journalled in bearings and if the motor is brushless and the like. The life span of the membrane pump depends to a lesser degree upon the membrane or other parts of the pump. This results in that the cost of a motor for a membrane pump with a long life span becomes a significant part of the total cost of the membrane pump. It is easy to understand why the motor is a significant part of the cost, when motors with long life spans are mechanically and electronically advanced to manufacture with many accompanying details. This problem is also described in patent document U.S. Pat. No. 6,589,028 where a similar discussion is presented for these types of pumps.

For quite some time it has been known that a membrane pump may be driven with the aid of one or more electromagnets. An electromagnet produces a back and forth movement that causes the membrane to produce a pumping movement. Powering a membrane pump with an electromagnet instead of a rotating motor can at first glance seem as a better solution. An advantage with electromagnetic driven membrane pumps is that they are more closely coupled to the membrane which renders it possible to have greater control over length of stroke, frequency and speed in the actual pump housing compared to membrane pumps powered by rotating motors.

Electromagnetic pumps are still less common despite that they logically should be cheaper to manufacture and are more easily controlled than pumps powered by rotating motors. This is caused by several problems that together result in the fact that an electromagnet is not obviously better at powering a membrane pump compared with a rotating motor. A significant problem with electromagnetic driven pumps is that they are difficult to gear up without the magnetically driven body losing its straight linear movement. This often also results in creating additional points of friction that are expensive to mount in bearings.

Additional problems with existing electromagnetic driven membrane pumps consist of suspension mounting and bearing support of the moving part that drives the membrane, comprised of a magnet or a magnetic conducting body. For an electromagnetic driven membrane pump to attain a long life span as well as being as efficient as possible, it is paramount that the moving parts have as low a friction as possible, preferably no friction at all. In order to maximize the life span of the membrane pump, it is furthermore important to counteract the rotation in the coupling between the membrane and the moving part (axle or the like). In order to maximize the life span of the membrane, it is furthermore important to counteract the transverse loads that can reduce the life span of the membrane as well as counteracting the membrane stretching so much that it strikes the turning position. It is also of great importance that the membrane has a well defined neutral point when the pump is in its rest position so equality in performance is attained during multiple productions.

The above mentioned problems with pumps based on electromagnets gives rise to very intricate designs comprised of many details making production very costly. An example of such a design is for example described in patent document U.S. Pat. No. 5,360,323. This patented design is very different from the present invention.

PRIOR ART

In patent document U.S. Pat. No. 3,572,980 a pump design is described that is intended increase the pressure in a fluid. The design is comprised of a piston and cylinder and a pump chamber. The piston, suspended with the aid of a flat spring, is maneuvered with the aid of a solenoid. This flat spring comprises both a back spring for returning the piston as well as for sealing the pump chamber. The flat spring described in the patent document differs greatly from the present invention because it is uniform and lacks legs. The problem with using a uniform spring in small membrane pumps is that the power given off by the electromagnets is so small that the spring steel plate would have to be very thin for the membrane pump to function. Another problem arises during the use of a uniform flat spring in a small membrane pump. The problem is that a uniform plate is essentially elastic in the center of the spring when power is applied there. Therefore it is not possible to control the resiliency of the spring which causes major stress and wear and tear on the attachment. This wear and tear may cause play which may greatly shorten the pump's life span. Furthermore all the strain in the material will be concentrated to a limited area where the power is brought to bear and not evenly distributed through the spring. This contributes further to shorten the life span of the spring and the membrane pump. A uniform spring is therefore not suitable for use in a smaller membrane pump. The design differs still further from the present invention because the spring used by the present invention has a much longer spring suspension length. The spring suspension length for the spring according to the present invention is comprised of both the radius and the elastic legs circular length.

SUMMARY OF THE INVENTION

Even if existing electromagnetic driven membrane pumps many times achieve there purposes, none of these combine the advantages from both membrane pumps driven by a rotating motor and membrane pumps driven by electromagnets without any of the disadvantages entailed by both types. The purpose of the present invention is therefore to bring about a membrane pump which encompasses the advantages from the respective types of membrane pumps essentially without any of there disadvantages.

BRIEF DESCRIPTION OF THE DRAWINGS

The present invention will be described in detail in the following text with references to the enclosed schematic drawings which show, in an exemplifying purpose, the current embodiment of the invention.

DESCRIPTION OF THE PREFERRED EMBODIMENTS

Figure 1:
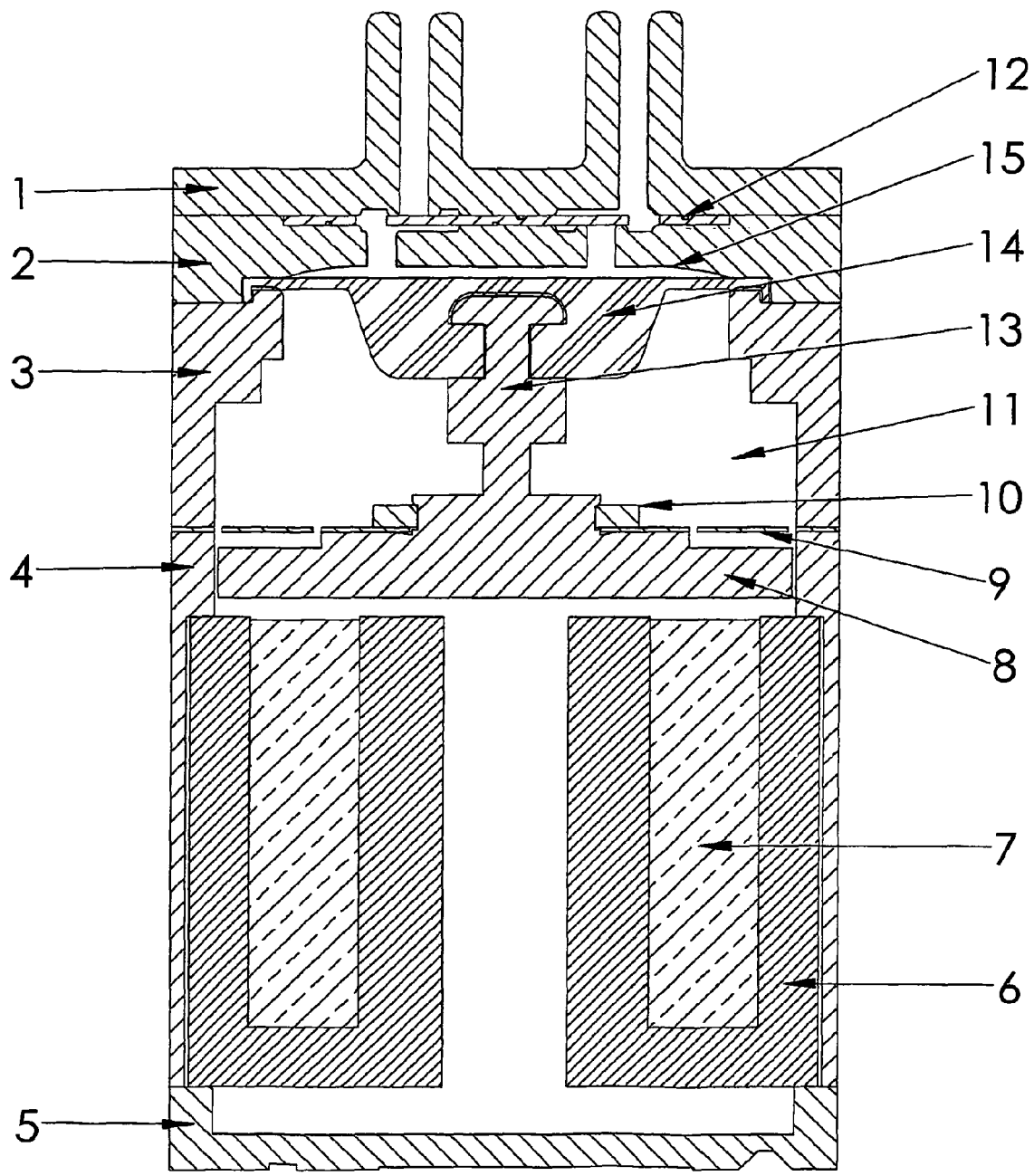
FIG. 1 shows in cross section the first embodiment of an electromagnetic driven membrane pump optimized to emit negative pressure.

With reference to FIG. 1 the first preferred embodiment of an electromagnetic driven membrane pump optimized to emit negative pressure is shown. The membrane pump is comprised of a casing (enclosed covering) hereafter called the pump housing essentially comprised of a first gable 1, a flange 2, a first middle part 3, a second middle part 4 and a second gable 5. In the pump housing an inner space 11 is created which is separated by a membrane 14, which is connected to the pump housing's inner walls, thereby creating a space in the form of a pump chamber 15 between the membrane and the second flange. The connection of the membrane to the walls of the pump housing can preferably be accomplished by compressing the membrane between the flange 2 and the middle part 3. By compression of the membrane the connection between the membrane and the pump housing's wall is sealed which in this example is constituted by the flange and the middle part. The membrane can in its outer part be designed with a thicker part whereby the membrane is held in a fixed position in the membrane's radial direction. With the aid of the membrane's thicker part the seal between the membrane and the pump housing is also improved. The pump chamber is via channels in the flange 2 connected respectively with an intake and an outlet in the gable 1 and the flange 2, through which the pumped medium (fluid, gas, etc) can flow in or out of the membrane pump respectively. In order to control the direction of flow, the pump is equipped with a clack valve (check valve, one-way valve or other device for preventing backflow) 12 for the intake and the outlet respectively. In this embodiment the clack valve for intake and outlet respectively is preferably integrated into a single unit. Alternatively, the clack valves may be separated from intake as well as from outlet. The clack valves can be constructed of previously know materials suited for the purpose. The intake as well as the outlet in the gable 1 is preferably tube-formed so that connecting hoses or pipe (not shown in the figures) may be connected to the connections. Alternatively, other suitable forms may be used for the connections.

The membrane may be constructed of silicon, rubber or another type of material suitable for the purpose.

The membrane is attached (alternatively fastened or fixed) to an axle 13 that is positioned to cause the membrane to move in the membrane pump's axial direction whereby the volume of the pump chamber can be increased or decreased respectively. The membrane and the axle are appropriately fixed to one another, suitably by the axle meshing with a holding segment in the membrane. Alternatively, the attachment of the axle to the membrane can be accomplished with another type of previously known for the purpose suitable device for attachment.

In order to steer the axle in an axial direction, the axle is suspended in at least one suspension with at least two suspension points. The suspensions exist for steering the axle's movement in an axial direction. In this embodiment the membrane functions as one of at least two suspensions for the suspension of the axle. The axle's second suspension is comprised of at least one elastic element 9. The elastic element is preferably comprised of a flat spring. The axle runs through the flat spring and is fixed to the flat spring with a locking jam 10. The locking jam may be comprised of a lock-ring or some other for the purpose suitable attachment device. Suitably, the spring stretches in a principally radial direction out towards the pump house wall and then fixed to the pump house wall. In this embodiment the flat spring is attached suitably between the middle part 3 and the other middle part 4. Alternatively, the spring may be attached in accordance to another suitable attachment method and to another for the purpose suitable place in the pump.

The flat spring is equipped with at least one elastic leg. The flat spring is preferably equipped with four elastic legs. The use of only one leg has the disadvantage of it not being possible to attain an axial movement without the angle of the spring changing in relation to the axle's center. A flat spring with two elastic legs is rigid in one direction but the torsion resistance in the other direction is much poorer.

The axle is made of a ferro-magnetic material; alternatively a ferro-magnetic material may be fitted to the axle or applied to the axle in some other way. With the term, ferro-magnetic material is meant both a magnetic conducting material and/or a permanent magnetic material.

Thus the axle is the magnetically driven element or alternatively the axle can be a carrier of the magnetically driven element. In a preferred form of execution of the axle, the axle is the magnetically driven element. The axle is made of a magnetically conducting material, suitably in some form of soft magnetic material that is usually used in electromagnets.

The axle affected by the magnetic field from at least one electromagnet 7 drives (moves) the axle (the movable part) in the membrane pump's axial direction. The electromagnet can in its simplest form be comprised of coil without an encompassing metal or metal core. The electromagnet is preferably comprised of a coil 7 with a metal core 6. The electromagnet is preferably hollow. The axle, with a high coefficient of permeability adjusted for the pump's range of pump frequencies, is moved by the electromagnet's need to close the magnetic field that the electromagnet produces. In order to optimize the force between the electromagnet and the magnetically conducting material in the axle, the axle is suitably equipped with a disk-shaped part 8. The electromagnet's coil, alternatively coils, is connected in the customary manner to an electrical energy source with for the purpose suitable wiring (not shown in the figures).

When the electromagnet pulls the axle with the disk-shaped part toward itself, the volume in the pump chamber will increase simultaneously as energy is accumulated in the flat spring. When the volume in the pump chamber increases, a negative pressure in the pump chamber is created, thereby allowing fluid or gas to flow in through the intake. The outlet is equipped with a clack valve which stops fluid or gas from flowing in through the outlet when the volume in the pump chamber increases. When the electromagnet no longer pulls the axle toward itself, the accumulated energy in the flat spring will cause the axle to return to its initial position (neutral point) thereby reducing the volume in the pump chamber. When the volume in the pump chamber decreases, the pressure in the pump chamber will increase, allowing fluid or gas to flow out through the outlet. The intake is equipped with a clack valve which stops fluid or gas from flowing out through the intake when the volume in the pump chamber decreases. The elastic force from the flat spring in combination with the force from the membrane results in the axle striving to return to a specific neutral point where the axle is not affected by the force of the electromagnet. The specific neutral point allows for the pump to be serially manufactured with great accuracy, with even performance and that the spring dampens the axle's and the membrane's movement toward their respective end points of the pump stroke. Thanks to the spring's braking affect, wear and tear on the membrane is minimized.

The membrane pump may be controlled by a control system of some type of previously known control system. Alternatively, some form of control system that is developed in the future, suitable for the purpose, may be used to control the pump. The specific neutral point makes the membrane pump very suitable for control by a control system.

Figure 2:
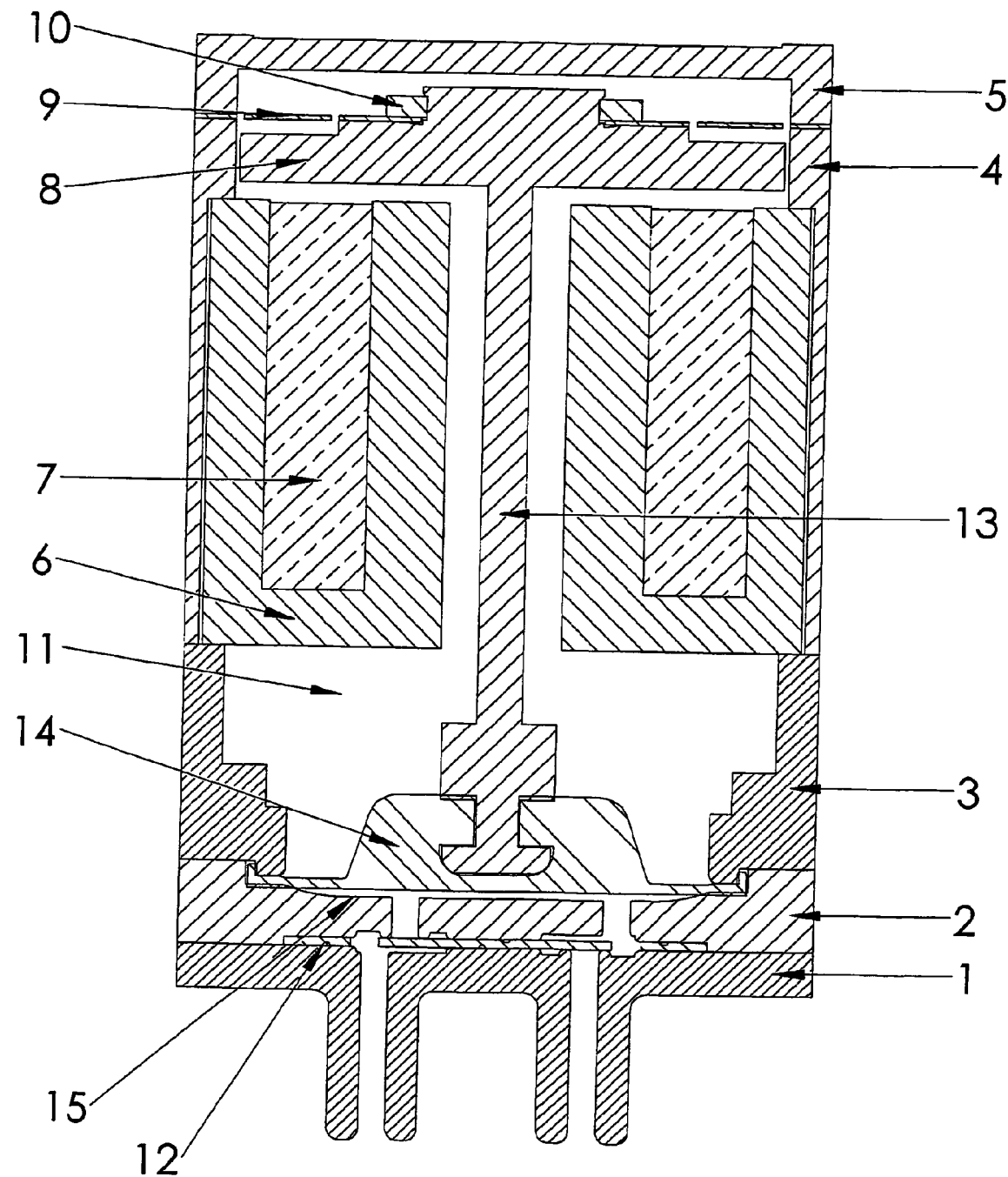
FIG. 2 shows in cross section the second embodiment of an electromagnetic driven membrane pump optimized to emit positive pressure.

FIG. 2 shows an alternative form of execution for a membrane pump in accordance with the present invention that is optimized to produce positive pressure. The design essentially coincides with the first form of execution however with the differences that the gable 1, the flange 2 and the middle part 3 shift places with gable 5 and that axle 13 is much longer than in the first form of execution. The axle is in its one end attached to the membrane. The axle runs through the hollow electromagnet 7 and 6 and is suspended in the flat spring 9. In this form of execution the electromagnet is placed between the axle's disk-shaped part and the membrane.

When the electromagnet pulls the disk-shaped part of the axle, the axle will be pushed through the electromagnets hollow part and in this way affect the attached membrane. Through the axle's movement the membrane will affect the volume in the pump chamber to decrease simultaneously as energy is accumulated in the flat spring. When the volume in the pump chamber decreases, a positive pressure in the pump chamber is created, thereby allowing fluid or gas to flow out through the outlet. The intake is equipped with a clack valve which stops fluid or gas from flowing out through the intake when the volume in the pump chamber decreases. When the electromagnet no longer pulls the axle's disk-shaped part toward itself, the accumulated energy in the flat spring will cause the axle to return to its initial position (neutral point) thereby increasing the volume in the pump chamber. When the volume in the pump chamber increases the pressure in the pump chamber decreases, thereby allowing fluid or gas to flow in through the intake. The outlet is equipped with a clack valve which stops fluid or gas from flowing in through the intake when the volume in the pump chamber increases. The elastic force from the flat spring results in the axle striving to return to a specific neutral point where the axle is not affected by the force of the electromagnet.

Because the membrane pumps are essentially comprised of the same types of components, both as pressure optimized and negative pressure optimized designs, implies that the pump with a simple revamping can be rebuilt from a negative pressure optimized pump to a pump optimized for positive pressure. The pump can be rebuilt by gable 1, flange 2 and the middle part 3 shifting places with gable 5. Furthermore the axle needs to be exchanged from a shorter to a longer axle. Of decisive importance for reversing the pump, is that the electromagnet is hollow. The axle is drawn through the hollow cavity in the electromagnet allowing the axle to be attached to the flat spring and the membrane.

Figure 3:
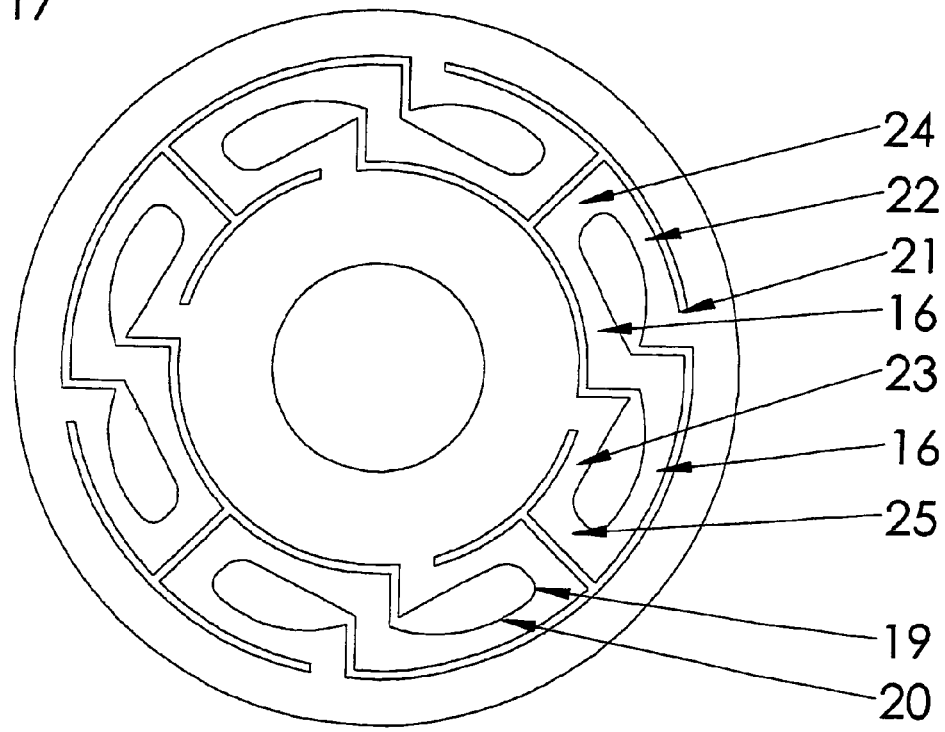
FIG. 3 shows a flat spring with four legs.

With reference to FIG. 3 a first specially preferred embodiment of the flat spring is shown. The spring is essentially flat when it is not affected by any force. The flatness of the spring provides for good lateral stability. In regards to fatigue and life span, the spring is suitably made of spring steel plate, but may even be made of other suitable elastic material such as for example some type of polymer or composite. The spring has in its center a hole whose diameter adjusts to the axle to be put through the hole. The spring has an outer and an inner ring-shaped part that are connected with each other by at least one leg, preferably four legs as shown in FIG. 3. Each leg is comprised of parts 22, 16 and 23 and the ends are connected with the outer ring and the inner ring.

A spring with four elastic legs has shown itself to be a spring that puts minimal stress on the material and at the same time have the ability to mirror-invert the legs in pairs and thereby secure that no rotation of the axle occurs during the axial stroke (movement). In addition, four legs provide a sufficient amount of attachment points to the inner ring in order to achieve similar torsion stability in all directions.

Figure 4:
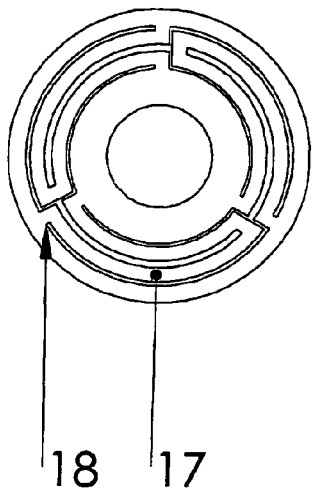
FIG. 4 shows a flat spring with three legs.
Figure 5:
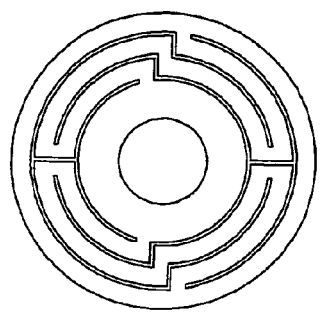
FIG. 5 shows a flat spring with two legs.
Figure 6:
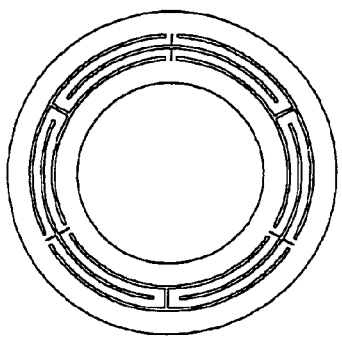
FIG. 6 shows a flat spring with six legs.

The springs in FIGS. 3 and 5 have been further improved compared to the springs in FIGS. 4 and 6. The legs in FIGS. 4 and 6 are divided into two parts of approximately equal length 17. This division results in a great strain to the attachment points of the inner and outer ring. This occurs for example at attachment point 18 where the attachment for the outer ring is positioned. The legs in FIG. 3 are designed so that the leg is divided into three parts of different lengths. Part 16 of the leg is much longer than the two other parts 22 and 23 and is placed in the middle parts 22 and 23. The purpose for this is so part 16 can create the greatest twisting moment in positions 24 and 25. The results of this are that the short parts of the leg (22 and 23) are forced to turn with the same twist as the longest leg's (16) moment creates and the longer leg can thereby achieve a steeper slope (angle) and this in the end gives a longer stroke. Furthermore, this leg division creates no strain at the attachment points of the outer and inner rings at for example attachment point 21 where the attachment for the outer ring is positioned. Strain on positions 24 and 25 can be further dispersed over a larger area in the material with the aid of chamferings in positions 19 and 20.

In reference to FIG. 4 an alternative embodiment of the essentially flattened spring with three elastic legs is shown. Three legs may give a similar turning stability as a spring with four legs but it does not provide for the possibility to mirror-invert the legs in pairs. Alternatively, the spring may be made of other types of elastic material such as for example plastic or composites.

FIG. 6 shows a second alternative form of execution of the invention with six elastic legs. A spring with six legs provides for the possibility to mirror-invert the legs in pairs in order to secure that no rotation of the axle occurs during its movement in an axial direction. A flat spring with six legs provides however for a shorter leg length than the case with a flat spring with four legs, resulting in more strain in the material per stroke length.

ADVANTAGES

With an electromagnetic driven membrane pump according to the present invention, a membrane pump is provided that is much more inexpensive and easier to manufacture than a membrane pump driven by an electric motor.

Because the flat spring is made from a thin plate, a spring with an accurately defined neutral point (the spring's initial position) is attained. The design of the spring makes certain that all of the springs that are manufactured receive the same neutral point which in turn ensures even performance and quality.

Furthermore, the membrane pump according to the present invention is made of fewer components than pumps with similar performance and life span.

With the suspension of the axle in at least two suspensions, whereby at least one is comprised of at least one flat spring, results in that no surfaces need be mounted with traditional slide bearings or similar bearings. Through this design it is possible to manufacture a pump at low cost with a long life span without traditionally mounted bearings.

The advantage with the suspension of the axle in at least one flat spring with at least four legs, that are mirror-inverted from one another, is that the spring, due to its width, gives the axle a very good lateral stability in the radial direction and at the same time provides for easy movement in the axial direction. Furthermore the flat spring's in pair's mirror-inverted legs results in it not conveying any rotation of the axle during the axial movement.

The membrane pump's design consisting of a flat spring with excellent positioning precision, results in the use of relatively shorter stroke lengths than existing membrane pumps with similar performance. The spring's excellent positioning precision makes it possible to produce pumps with short stroke lengths enabling the axle to work closer to the electromagnet resulting in higher pressure power. Furthermore, a short stroke length results in less wear and tear on the membrane which provides for a longer life span.

A flat spring with excellent positioning precision gives the membrane a long life span thanks to the force from the spring being used during deceleration of the membrane in the pumps turning position. Furthermore, the force absorbing flat spring provides for the construction of a relatively thin membrane with a long life span thanks to the spring being able to absorb stretching forces and lateral forces.

The advantage with using magnetic reluctance compared to using a permanent magnet is that it is possible to make a simple design with few details.

Alternative Forms of Execution

Even if certain preferred embodiments have been described in detail, variations and modifications within the limits of the invention can become apparent for experts in the field, and all such variations and modifications are deemed to fall within the scope of the invention. Thus, membrane pumps where the axle's weight or lateral forces occurring in the membrane surpasses the membrane's strength may be equipped with additional flat springs for the suspension of the axle.

In the same way two electromagnets may be placed on each side of the disk and used if the pump needs to be just as strong for both vacuum and positive pressure.

The axle may even be a carrier of a permanent magnetic material or be made of a permanent magnetic material. The placement of a single external coil will then allow the magnet to be driven in two directions. Furthermore, the magnetic field can be concentrated around the encompassing coil with the aid of a soft magnetic material, as long as it does not lie at one of the ends of the axial movement, because the magnet may then be drawn to a stop. A relatively longer stroke length can be achieved with less force with this design. This design is more expensive because it uses a permanent magnet and more complex details.

The flat form of the spring and that it is comprised of at least two legs is paramount for the design, but it may of course have other forms than circular. The spring can also be divided into several springs, each comprised of at least one leg for the purpose of attachment to the same position along the axle's length for the purpose of achieving the same features of a spring with three legs.

The invention claimed is:

1. An electromagnetic driven membrane pump for fluids, comprising
   a pump housing inside which at least one pump chamber (15) is formed with at least one intake and at least one outlet,
   said pump chamber (15) formed and delimited between a gable (1) of the pump housing and a membrane (14) attached to a wall (4) of the pump housing to form a seal,
   said membrane (14) attached to an axle (13) running in an axial direction of the pump housing, said running axle (13) suspended in at least two separated suspensions in a longitudinal direction of the axle (13),
   at least one of said suspensions being a flat spring (9) attached to the axle (13) and running in a radial direction out toward and attached to the wall (4) of the pump housing,
   said axle (13) being partly or entirely composed of, including or carrying a magnetic material to be driven by a magnetic field from an electromagnet (7) mounted on and within the pump housing for oscillation in its longitudinal direction and moving said membrane (14) in a corresponding oscillating movement,
   wherein said flat spring (9) is composed of an inner ring-shaped part attached around to said axle (13) extending through an inner opening of said spring (9) by attachment means (10) and an outer ring-shaped part attached to the pump housing wall (4) around a continuous outer circumference thereof, and
   said inner and outer ring-shaped parts being fixed to and interconnected with one another by at least three separated, circumferentally-extendinq elastic legs arranged around a point where said spring (9) is attached to said axle (13) extending therethrough by said attachment means (10).

2. An electromagnetic driven membrane pump according to claim 1, wherein one of said suspensions for said axle (13) is composed of said membrane (14) and at least one other second suspension is composed of said flat spring (9).

3. An electromagnetic driven membrane pump according to claim 1, wherein at least two of said suspensions for said axle (13) are each composed of a flat spring (9).

4. An electromagnetic driven membrane pump according to claim 1, wherein said flat spring (9) has an even amount of legs of which half of the legs are mirror-inverted in relation to the other half of the legs.

5. An electromagnetic driven pump according to claim 1, wherein said flat spring (9) has four legs.

6. An electromagnetic driven pump according to claim 1, wherein said legs are each composed of a relatively longer part (16) and a relatively shorter part (22, 23), with the relatively longer part (16) connected at opposite ends with separate relatively shorter parts (22, 23).

7. An electromagnetic driven pump according to claim 1, wherein the flat spring (9) is composed of spring steel.

8. An electromagnetic driven pump according to claim 1, wherein the flat spring (9) is composed of elastic plastic.

9. An electromagnetic driven pump according to claim 1, wherein the flat spring is composed of an elastic composite.

10. An electromagnetic driven pump according to claim 1, wherein the intake and outlet are equipped with clack valves.

11. An electromagnetic driven pump according to claim 1, wherein said electromagnet (7) is hollow.

12. An electromagnetic driven pump according to claim 2, wherein said flat spring (9) has an even amount of legs of which half of the legs are mirror-inverted in relation to the other half of the legs.

13. An electromagnetic driven pump according to claim 12, wherein said flat spring (9) has four legs.

14. An electromagnetic driven pump according to claim 2, wherein said flat spring (9) has four legs.

15. An electromagnetic driven pump according to claim 3, wherein said flat spring (9) has four legs.

16. An electromagnetic driven pump according to claim 4, wherein said flat spring (9) has four legs.

17. An electromagnetic driven pump according to claim 12, wherein said legs are each composed of a relatively longer part (16) and a relatively shorter part (22, 23), with the relatively longer part (16) connected at opposite ends with separate relatively shorter parts (22, 23).

18. An electromagnetic driven pump according to claim 4, wherein said legs are each composed of a relatively longer part (16) and a relatively shorter part (22, 23), with the relatively longer part (16) connected at opposite ends with separate relatively shorter parts (22, 23).

19. An electromagnetic driven pump according to claim 3, wherein said legs are each composed of a relatively longer part (16) and a relatively shorter part (22, 23), with the relatively longer part (16) connected at opposite ends with separate relatively shorter parts (22, 23).

20. An electromagnetic driven pump according to claim 2, wherein said legs are each composed of a relatively longer part (16) and a relatively shorter part (22, 23), with the relatively longer part (16) connected at opposite ends with separate relatively shorter parts (22, 23).

21. An electromagnetic driven pump according to claim 1, wherein said spring (9) additionally comprises four circumferentially-extending portions radially-separated from one another.

22. An electromagnetic driven pump according to claim 1, wherein said axle (13) comprises a disk-shaped protrusion (8) provided on an end thereof,
  with said spring (9) being mounted on a side of said disk-shaped protrusion (8) opposite the end of said axle (13).

* * * * *